Oct. 25, 1927.  E. M. BOURNONVILLE  1,646,949
ROTARY VALVE
Filed April 15, 1926  2 Sheets-Sheet 2
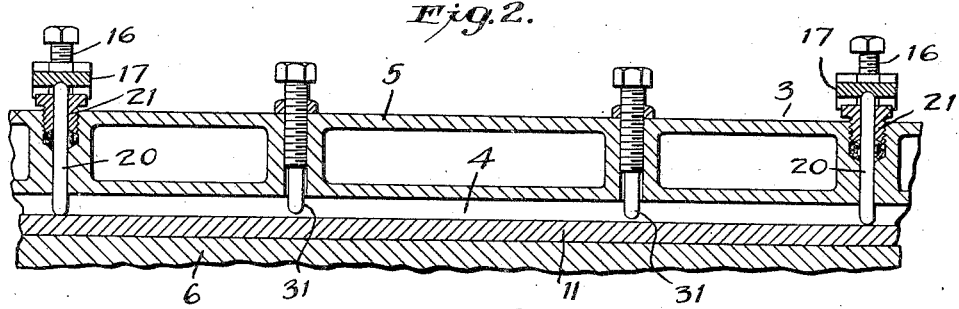
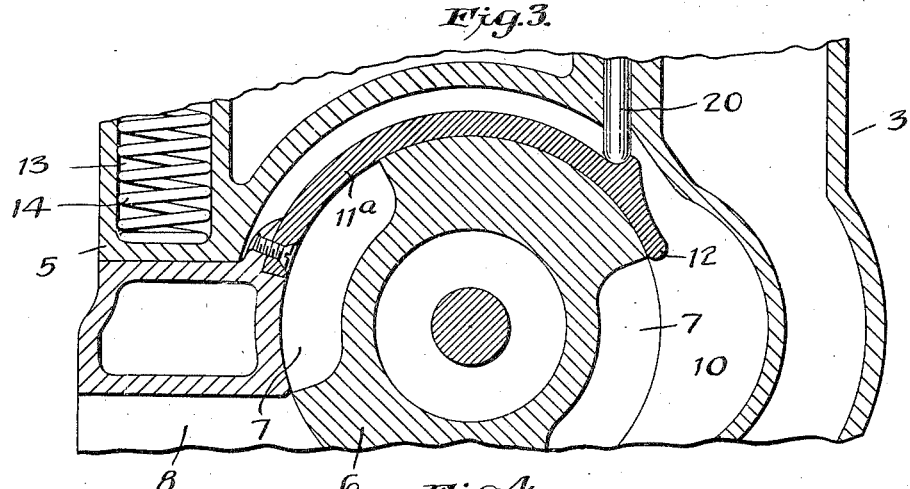
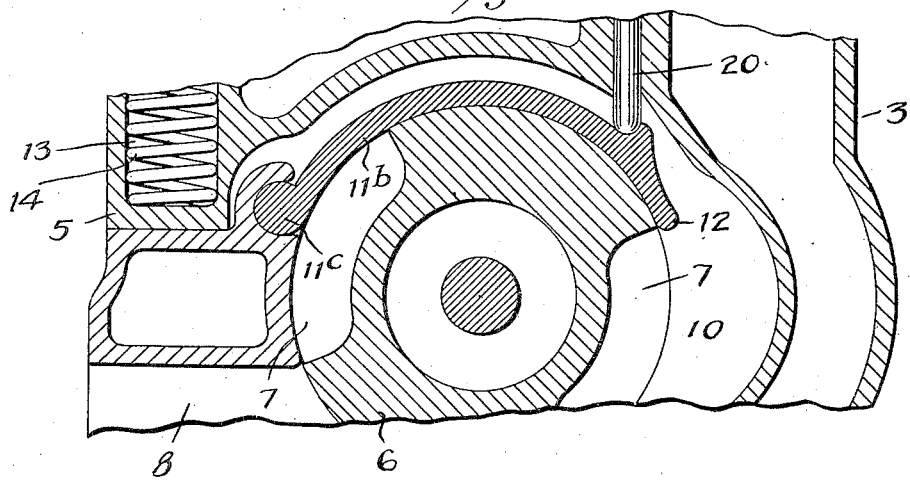

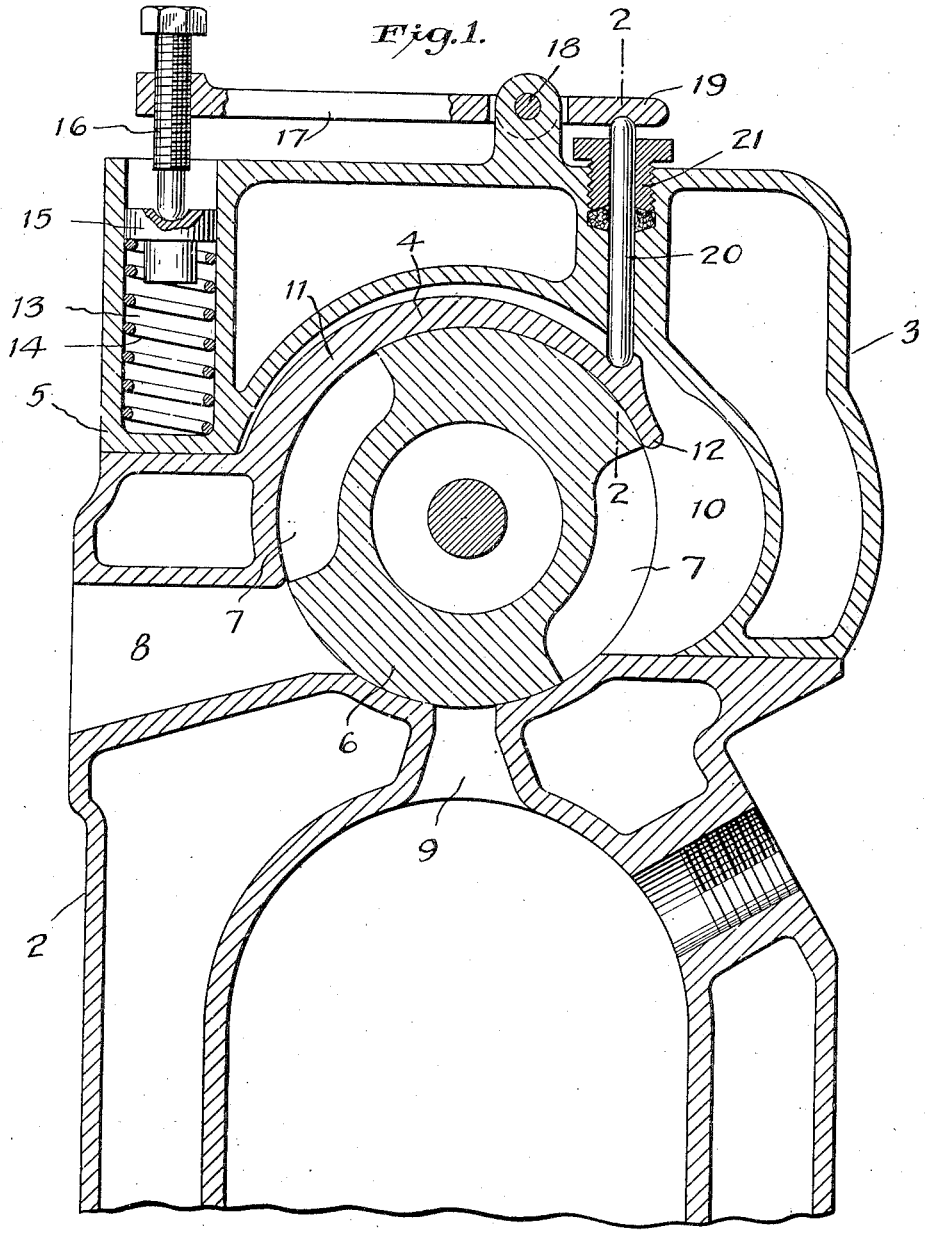

Patented Oct. 25, 1927.

1,646,949

UNITED STATES PATENT OFFICE.

EUGENE M. BOURNONVILLE, OF JERSEY CITY, NEW JERSEY.

ROTARY VALVE.

Application filed April 15, 1926. Serial No. 102,178.

The invention relates to a rotary valve for internal combustion engines. The conditions affecting a rotary valve in an automobile or other internal combustion engine, including the great heat, the expansion and contraction, the pressure or force of the explosions, and the necessity for preserving within very fine limits a clearance between the rotary member and its bearing sufficient to prevent cutting and seizing and to preserve the oil film, but not great enough to cause loss of power, are very exacting. The object of the present invention is to provide a construction which is very efficient for such purposes and simple to manufacture.

The invention involves a yielding or flexible bearing wing curving over the cylindrical surface of the rotary valve member, said bearing or wing being secured or integral with the casing at one side and free at the other, so as to be adapted for slight come and go under expansion and contraction and the effect of pressure from the power cylinder on the rotary valve member, suitable means being provided for sustaining the wing so as to balance or control the pressure and yielding. Other objects and features of the invention will become apparent as the specification proceeds.

In the accompanying drawings forming part hereof:

Fig. 1 is a cross-sectional view through the upper part of one cylinder of an engine and the valve which extends lengthwise over the tops of the cylinders;

Fig. 2 is a fragmentary longitudinal section on the line 2—2 of Fig. 1; and

Figs. 3 and 4 are fragmentary cross-sectional views illustrating modified forms.

The engine cylinder casting is marked 2, and 3 is the valve casing. The part 4 of the valve casing is shown formed integral with the cylinder casting, while the part 5 is a removable head. The valve is more specifically of the combined intake and exhaust variety, and the provisions which will be described are particularly advantageous for such a valve, though not limited thereto. Accordingly, the rotary valve or plug member 6 is shown provided with lateral transfer ports 7, which, as the valve member turns, first connects an exhaust port or space 8 in one side of the casing with a cylinder port 9 at the bottom, and then connects this port with an intake space or manifold 10 in the other side of the casing, in a well-known manner. It will be understood that the valve-casing and the rotary member extend along over the tops of the several cylinders of the engine, and that the rotary member is provided with one or more of the transfer ports 7, properly positioned, for each of the cylinders. The part 5 of the valve casing is simply a cap, forming part of the gas-tight enclosure. The part 4 is formed internally with so much of a cylindrical bore as is necessary to give bearing to the turning member, this bore being designed to afford tight seals between the cylinder port and the intake and exhaust spaces on either hand, and between the exhaust and intake spaces.

The upper portion of the hollow cylindrical bearing surface is formed on the inner side of a bearing wing 11 constituting an important part of the invention. In the preferred construction, this wing is an integral portion of the lower part of the valve casing, springing therefrom at the exhaust side, above the exhaust port, and arching free of the fixed top of the casing, up and over the rotary member for a considerable distance toward the intake side of the casing, its free edge or side 12 preferably terminating adjacent the intake manifold. The wing might, though with less advantage, be arranged to extend from its fixed to its free end in a reverse direction. The wing extends lengthwise of the multicylinder valve, constituting a curved roof, and it will be naturally understood that it may be continuous or all in one piece lengthwise of the valve or not. Such a wing or cantilever formed of the cast metal of the casing and made of suitable length or width transversely of the valve and of suitable thickness or taper, which matters are variable in different cases, serves very advantageously as a flexible self-adjusting shoe or top bearing to compensate or allow for thermal expansion, so as to preserve a substantially uniform clearance, without seizing on the one hand, or loss of compression through looseness on the other hand.

To aid the wing in its function, and to support it against the pressure which acts upon the rotary valve member through the cylinder port, yielding means of sufficient power are provided for sustaining, restraining or pressing upon the free portion of the wing. The form of such means may be considerably varied. In the preferred embodiment, the top part of the valve casing is provided with a suitable number of cylinder chambers 13, open at the top and each containing a spring 14. This spring acts upon a follower or piston 15 in the chamber, which in turn presses against the lower end of a screw 16, which is threaded through the end of the long arm of a lever 17 fulcrumed at 18 on the top of the casing. The much shorter arm 19 of this lever bears upon the upper end of a thrust pin 20, which passes through a guide opening in the top wall of the casing, the sliding joint at this point being made tight by a stuffing-box 21. The lower end of the pin 20 rests against the back of the wing adjacent its free edge, in order to apply the multiplied effect of the spring thereto. A suitable number of springs or other pressure-producing arrangements acting through leverages, or otherwise, will hold the flexible bearing wing to the valve member with substantially equally distributed pressure against the pressure exerted through the valve member, while permitting the wing bearing to yield in response to expansion as the valve becomes heated up. By turning the screw 16, the amount of the counter-pressure on the valve member may be adjusted to take care of wear and other conditions.

The controlling mechanism just described is advantageous, but is to be understood as being primarily illustrative. The pressure means need not necessarily consist of springs, and while the sustaining pressure or force of such means is most advantageously applied through leverage, I do not necessarily limit myself to this.

In order to prevent the bearing wing yielding to an extent that would be undesirable or possibly dangerous, limit stop pins 31 are set in the head of the casing and carefully adjusted and locked, so as solidly to support the wing in case it should recede more than an ordinary amount. The amount of flexing or yielding of the bearing wing is, of course, very slight.

A yielding bearing wing made in one piece with the casing casting, and yieldable entirely by virtue of the kind of flexibility which such metal exhibits when made into appropriate forms, is preferred because of its cheapness and effectiveness. However, the yielding cantilever wing bearing may be made of a separate piece, of steel, for example, as shown at 11$^a$ in Fig. 3, such wing being solidly secured at its fixed end or side by screwing, riveting, or in any suitable manner. A wing made of a separate piece may also be fulcrumed or hinged or otherwise movably held at one point in the casing, such a wing being marked 11$^b$ in Fig. 4, and its fulcrum 11$^c$. There is such flexibility in the wing as to enable it to conform to the rotary member under all conditions.

In the several forms of the valve the fixed part of the bearing is included within less than 180°, that is to say, within less than half the circuit. Therefore the rotary valve member can never become imprisoned within the fixed bearing as the result of expansion.

The flexible wing 4 of the yielding bearing is also seen to extend over somewhat less than 180° in another part of the circuit. The intake gas space, port or manifold opening intervenes at one side between the wing and the fixed bearing, and the cylinder and exhaust ports or passages occur within the limits of the fixed bearing.

Various other forms of the invention may be devised, and there may be numerous changes in details and arrangement, and by way of substitution, addition or omission, and in the specific mode of operation.

I claim:

1. A rotary valve for an internal combustion engine, comprising a rotary member turning in a ported casing, with a flexibly yielding bearing wing which is held at one side and substantially free elsewhere, curving free for a substantial distance over the rotary member, substantially as set forth.

2. A rotary valve for an internal combustion engine, comprising a rotary member turning in a ported casing, with a flexibly yielding bearing wing which is held at one side and permitted to yield at its other side, curving free for a substantial distance over the rotary member, and yielding means for sustaining said bearing wing, substantially as set forth.

3. A rotary valve for an internal combustion engine, comprising a rotary member turning in a ported casing, with a flexible bearing wing which is solid with the casing at one side and substantially free at the other side, curving free and yielding for a substantial distance over the rotary member, substantially as set forth.

4. A rotary valve for an internal combustion engine, comprising a rotary member turning in a ported casing, with a yielding bearing wing which is formed in one piece with the casing, curving free over the surface of the rotary member for a substantial distance, substantially as set forth.

5. A rotary valve for an internal combustion engine, comprising a rotary member turning in a ported casing, with a yielding bearing wing which is held at one side and free at the other side, curving free for a substantial distance over the surface of the rotary member, yielding means for sustaining the free portion of said bearing wing, and a limit stop for limiting the yielding of said bearing wing, substantially as set forth.

6. A rotary valve for an internal combustion engine, comprising a rotary member turning in a ported casing, with a flexibly yielding bearing wing which is held at one side and free at its other side, curving free for a substantial distance over the surface of the rotary member, pressure-producing means, and means for multiplying the power of said means upon said bearing wing, substantially as set forth.

7. A rotary valve for an internal combustion engine, comprising a rotary member turning in a ported casing, with a flexibly yielding bearing wing which is held at one side and free at its other side, curving free for a substantial distance over the surface of the rotary member, a pressure-producing device, and means comprising a lever for applying the pressure of said device to the bearing wing, substantially as set forth.

8. A rotary valve for an internal combustion engine, comprising a rotary member turning in a ported casing, with a flexibly yielding bearing wing which is held at one side and free at its other side, curving for a substantial distance over the surface of the rotary member, a pressure-producing device, a thrust-pin guided in the casing to bear upon the free portion of said bearing wing, and a lever interposed between said device and said pin, substantially as set forth.

9. A rotary valve for an internal combustion engine, comprising a rotary member controlling intake and exhaust, a casing in which said member turns having intake and exhaust spaces, and a flexibly yielding bearing wing which is held with the casing at the side of the exhaust space and thence curves free for a substantial distance over the surface of the rotary member toward the intake space, substantially as set forth.

10. A rotary valve for an internal combustion engine, comprising a rotary member turning in a ported casing, with a flexibly yielding bearing wing which is held at one side and free at its other side, curving free for a substantial distance over the rotary member, yielding means for sustaining said bearing wing, and means for adjusting the sustaining force of said means, substantially as set forth.

11. A rotary valve for an internal combustion engine, comprising a rotary member turning in the bearing of a ported casing, with a flexible wing which is held at one side and substantially free at its other side forming a yielding roof of the bearing opposed to the pressure communicated to the rotary member from the engine cylinder, substantially as set forth.

12. A rotary internal combustion engine valve, comprising a rotary member turning in the partial bearing of a ported casing, and means comprising a curving, flexible, self-adjusting wing forming a yielding portion of the bearing for said rotary valve member.

13. A rotary internal combustion engine valve comprising a rotary member, a casing providing bearing for said member included within less than half the circuit, and means comprising a curving, flexible, self-adjusting wing affording yielding bearing for the rotary valve member in another part of the circuit.

14. A rotary internal combustion engine valve, comprising a rotary member controlling both intake and exhaust, a ported casing having intake and exhaust spaces and providing bearing for said rotary member of an extent less than half the circumference, and a flexible, self-adjusting wing forming a further part of the bearing for said rotary valve member.

15. A rotary internal combustion engine valve comprising a ported casing and a rotary member turning therein, with a flexible, self-adjusting wing bearing held at one point and thence curving free for a substantial distance over the rotary valve member, and means for exerting yielding pressure on said wing bearing in opposition to the pressure of the rotary valve member.

16. A rotary internal combustion engine valve comprising a rotary valve member, means affording fixed bearing for said rotary valve member included within less than 180°, and self-adjusting bearing means including a curving, flexible wing extending over somewhat less than 180° of the rotary member in another part of the circuit.

17. A rotary internal combustion engine valve comprising a rotary valve member controlling both the intake and exhaust gases, means affording fixed bearing for said rotary valve member included within less than 180°, yielding bearing means comprising a curving, flexible wing in bearing relation to the valve member in another part of the circuit, and means providing an intake gas space intervening at one side between the fixed and flexible bearings.

18. A rotary internal combustion engine valve comprising a rotary valve member controlling both the intake and exhaust gases, means affording fixed bearing for said rotary valve member included within less than 180°, there being exhaust and cylinder ports within the limits of said fixed bearing, yielding bearing means comprising a curving, flexible wing in bearing relation to the valve member in another part of the circuit, and means providing an exhaust space intervening between the fixed and flexible bearings.

EUGENE M. BOURNONVILLE.